United States Patent
Khodja

Patent Number: 5,943,464
Date of Patent: Aug. 24, 1999

[54] NONLINEAR OPTICAL DEVICE INCLUDING POLED WAVEGUIDE AND ASSOCIATED FABRICATION METHODS

[76] Inventor: Salah Khodja, 2630 Adela Ave., Orlando, Fla. 32826

[21] Appl. No.: 08/796,946

[22] Filed: Feb. 7, 1997

[51] Int. Cl.⁶ .................................................. G02B 6/26
[52] U.S. Cl. ............................ 385/122; 385/92; 385/49
[58] Field of Search ...................... 385/122, 129, 385/130, 131, 132, 1, 2, 141, 143, 145, 88–94, 49

[56] References Cited

U.S. PATENT DOCUMENTS

| | | | |
|---|---|---|---|
| 4,864,406 | 9/1989 | Khanarian et al. | 350/96.12 |
| 4,971,416 | 11/1990 | Khanarian et al. | 350/96.12 |
| 5,036,220 | 7/1991 | Byer et al. | 307/427 |
| 5,058,970 | 10/1991 | Schildkraut et al. | 359/328 |
| 5,061,028 | 10/1991 | Khanarian et al. | 385/132 |
| 5,310,511 | 5/1994 | Marcus | 264/22 |
| 5,519,802 | 5/1996 | Field et al. | 385/129 |

OTHER PUBLICATIONS

S.J. Lalama et al., "Exceptional Second–Order Nonlinear Optical Susceptibilities of Quinoid Systems", *Appl. Phys. Lett.*, vol. 39, No. 12, Dec. 15, 1981, pp. 940–942.

John O. Morley, "Non–Linear Optical Properties of Organic Molecules", *J. Chem. Soc. Faraday Trans.*, 1994, 90(13), pp. 1853–1855.

Levenson et al., Polymers for Second–Order Nonlinear Optics, "Advances in Organic Polymer–Based Optoelectronics", (1995), pp. 439–455.

Santo Di Bella et al., *Chemical Materials*, vol. 6, No. 7, 1994, "Sizable Second–Order Nonlinear Optical Response of Donor–Acceptor Bis (salicylaldiminato) nickel(II) Schiff Base Complexes", pp. 881–883.

Primary Examiner—Hung N. Ngo
Attorney, Agent, or Firm—James H. Beusse; Holland & Knight LLP

[57] ABSTRACT

A nonlinear optical device includes a waveguide adjacent a substrate. The waveguide is preferably formed of a polymer or other matrix material that contains chromophores having different dipole moment directions when in respective different energy states. The chromophores may be poled to have alternating first and second dipole moment directions thereby defining corresponding alternately poled waveguide portions. Accordingly, quasi-phase matching in the waveguide may be readily achieved for application in optical frequency conversion, for example. The chromophores preferably exhibit relatively high second-order nonlinearity and may be poled to have opposite first and second dipole moment directions. A method aspect of the invention is for making nonlinear optical devices and may include the steps of: forming a waveguide comprising a matrix material containing chromophores having different dipole moment directions when in different energy states; and poling the chromophores to have alternating first and second dipole moment directions thereby defining corresponding alternately poled waveguide portions. The chromophores may be poled by a patterned mask or by alternating light and dark bands formed by an interference pattern between two laser beams.

71 Claims, 10 Drawing Sheets

NONLINEAR OPTICAL DEVICE INCLUDING POLED WAVEGUIDE AND ASSOCIATED FABRICATION METHODS

FIELD OF THE INVENTION

The present invention relates to the field of optical devices, and, more particularly, to nonlinear optical devices and associated methods.

BACKGROUND OF THE INVENTION

Nonlinear optical devices are used in a wide variety of commercial applications. For example, in the area of laser frequency conversion, a polymeric channel waveguide may be used for second-harmonic generation (SHG), that is, frequency doubling. Nonlinear optical devices may also be used for parametric amplification in optical repeaters, such as for optical signals at telecommunication wavelengths (1300 and 1550 nm), along a fiber optic communications route. Other examples of nonlinear optics include cascaded second order nonlinear devices for all-optical switching, bistability, spatial solitons, etc. Unfortunately, these applications typically require phase matching between the interacting fundamental and second harmonic waves.

A relatively successful conventional technique for phase matching is called quasi-phase matching (QPM). It involves a periodic modulation of the refractive index or the macroscopic nonlinear susceptibility $\chi^{(2)}$ such that the harmonic fields generated in different parts along the waveguide interfere constructively at the output. Quasi-phase matching has been demonstrated, for example, in inorganic ferroelectric crystal waveguides, such as disclosed, for example, by D. Eger et al., in Applied Physics Letters, 1994, volume 64, page 3208. The development of such crystals has been restricted because of the difficulty of crystal growth and its relatively high costs. See also U.S. Pat. No. 5,036,220 to Byer et al. which is directed to a non-linear optical waveguide in a solid state crystal body, such as LiNbO$_3$.

U.S. Pat. No. 5,310,511 to Marcus discloses a planar polarizable body that is poled by placement between removable patterned plates which have conjugate patterns of openings therein and subjecting the openings to an electric field of the same polarity on opposite sides of the body. The electric field is sufficient to induce polarization of the body material in opposite directions through the thickness dimension with regions of alternate polarity at different lateral locations across the surface of the body.

In addition to ferroelectric crystals, poled polymer structures have been disclosed that contain chromophores with an extended π-electron-conjugated system exhibiting large second-order nonlinearity. In the poled polymer structures the chromophores are aligned based upon their dipole moments by an electrostatic field, while the polymer is heated to near its glass transition temperature. The structure is then cooled and the molecules are frozen in the poled or oriented position. Poled polymers also offer the possibility of relatively straightforward processing and perhaps relatively low cost fabrication.

In particular, poled polymer waveguides have been described for use as electro-optic devices on an integrated circuit substrate where phase matching is not required. U.S. Pat. No. 5,058,970 to Schildkraut et al. discloses another quasi-phase matching optical waveguide including an array of laterally spaced transparent electrodes in direct contact with a transmission medium containing similarly polar aligned organic molecular dipoles in overlying areas. The transparent electrodes and overlying areas of the transmission medium are each of the same width and spacing. However, the guided beam suffers from significant losses as it passes through the region of the substrate covered by the ITO electrode grating.

In addition, U.S. Pat. Nos. 4,865,406 and 4,971,416 both to Khanarian et al. disclose a frequency doubling optical waveguide provided by a polymer thin film which has a periodic structure for quasi-phase matching of propagating laser wave energy. U.S. Pat. No. 5,061,028 also to Khanarian et al. discloses a poled polymer waveguide. The optical waveguide includes three electrodes, one of which has a spatial periodic structure, and a side chain polymer waveguide positioned between two side chain polymer cladding layers. The electrodes apply electric fields of opposite polarity to pole the polymer side chains bidirectionally in a noncentrosymmetric orientation of periodic reverse polarity.

Unfortunately, attempts to make polymer thin film waveguides having nonlinear properties, such as for frequency conversion, have been relatively difficult. In particular, it is has been especially difficult to accurately and precisely produce areas of alternating poling over many coherent lengths, and wherein each alternating area has a relatively large percentage of chromophores properly aligned.

SUMMARY OF THE INVENTION

In view of the foregoing background, it is therefore an object of the present invention to provide a nonlinear optical device based upon polymer waveguide technology that can provide quasi-phase matching and/or precise phase control over the length of the waveguide.

It is another object of the invention to provide a method for accurately and readily manufacturing such a nonlinear optical waveguide.

These and other objects, features and advantages according to the invention are provided by a nonlinear optical device including a waveguide which, in turn, includes chromophores contained within a matrix material. The chromophores have different dipole moment directions when in different energy states. Moreover, the chromophores are poled to have alternating first and second dipole moment directions thereby defining corresponding alternately poled waveguide portions. The matrix material may be a polymer material, for example. Phase matching in the waveguide may be readily achieved with the lowest-order mode of the waveguide, which typically leads to the highest overlap integral, and, therefore, very efficient frequency conversion.

The chromophores preferably exhibit relatively high second-order nonlinearity. In one embodiment, the chromophores have opposite dipole moment directions when in the different energy states. In addition, the chromophores may have different dipole moment directions when in a ground energy state and when in an excited energy level state. The chromophores may comprise π-conjugated organic molecules or organo-metallic complexes and may be pyridinium cyclopentadienylide, or 7,7 diamino-8,8-dicyanoquinodimethan, or bis(salicylaldiminato)nickel(II) schiff base complexes, for example. The polymer may also be a crosslinked polymer.

The nonlinear optical device according to the invention may be used in many applications. For example, the chromophores may be periodically poled to create a quasi-phase matched waveguide so that harmonics of an input beam propagate through the poled waveguide portions and constructively interfere at an output of the waveguide. Devices in accordance with the present invention may provide: powerful blue lasers via frequency doubling of near infrared diode lasers; optical parametric amplifiers especially at telecommunication wavelengths 1300 and 1550 nm; optical parametric oscillators; and cascaded second order nonlinear devices for all-optical switching, bistability, spatial solitons, etc.

Several embodiments of devices may include a laser positioned adjacent a substrate and coupled to the waveguide. The poled waveguide portions may be equally spaced thereby defining a periodicity. Accordingly, periodicity control means may be provided for controlling the periodicity relative to the laser. For example, the periodicity control means may be provided by temperature control means for controlling a temperature of the waveguide. The periodicity control means may also control a wavelength and/or power of the laser. In addition, the periodicity control means may comprise electric field generating means for generating a controllable electric field in the waveguide.

The waveguide preferably extends generally parallel to a surface of the substrate. The substrate may be either a generally planar substrate or a tubular substrate, for example. The nonlinear optical device may preferably further comprise a package surrounding the substrate and the waveguide. Adjacent poled waveguide portions may have relatively sharp susceptibility transitions therebetween or relatively smooth transitions as desired for the particular application. At least one cladding layer and electrode layer may be positioned adjacent the waveguide. The cladding protects the waveguide, and the electrode layers may apply the electric field during manufacturing or when controlling the periodicity of the device.

In one embodiment, the chromophores may have non-opposite dipole moment directions when in different energy states. Adaptive electrode means may be provided to facilitate poling to pole the chromophores into first and second directions despite the non-opposite dipole moment directions of the chromophores themselves.

A method aspect of the invention is for making the nonlinear optical device. The method preferably comprises the steps of: forming a waveguide comprising a matrix material containing chromophores having different dipole moment directions when in different energy states; and poling the chromophores to have alternating first and second dipole moment directions thereby defining respective poled waveguide portions.

The chromophores may have different dipole moment directions when in a ground energy state and an excited energy state. Accordingly, the step of poling preferably comprises the steps of: selectively exciting alternating portions of the waveguide to change the chromophores to the excited state; and applying an electric field to pole the chromophores to the alternating first and second dipole moment directions. The method preferably further includes the step of heating the waveguide to near a glass transition temperature during the steps of applying the electric field and selectively exciting alternating portions of the waveguide.

The step of selectively exciting the polymer in one embodiment comprises the steps of: masking surface portions of the waveguide in a periodic pattern, and illuminating the masked surface of the waveguide to excite the chromophores of exposed portions of the waveguide. Alternately, the step of selectively exciting may include the steps of: generating a plurality of laser beams; and directing the laser beams to a surface of the waveguide to generate a pattern of alternating illuminated and dark bands via constructive and destructive interference of the laser beams.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
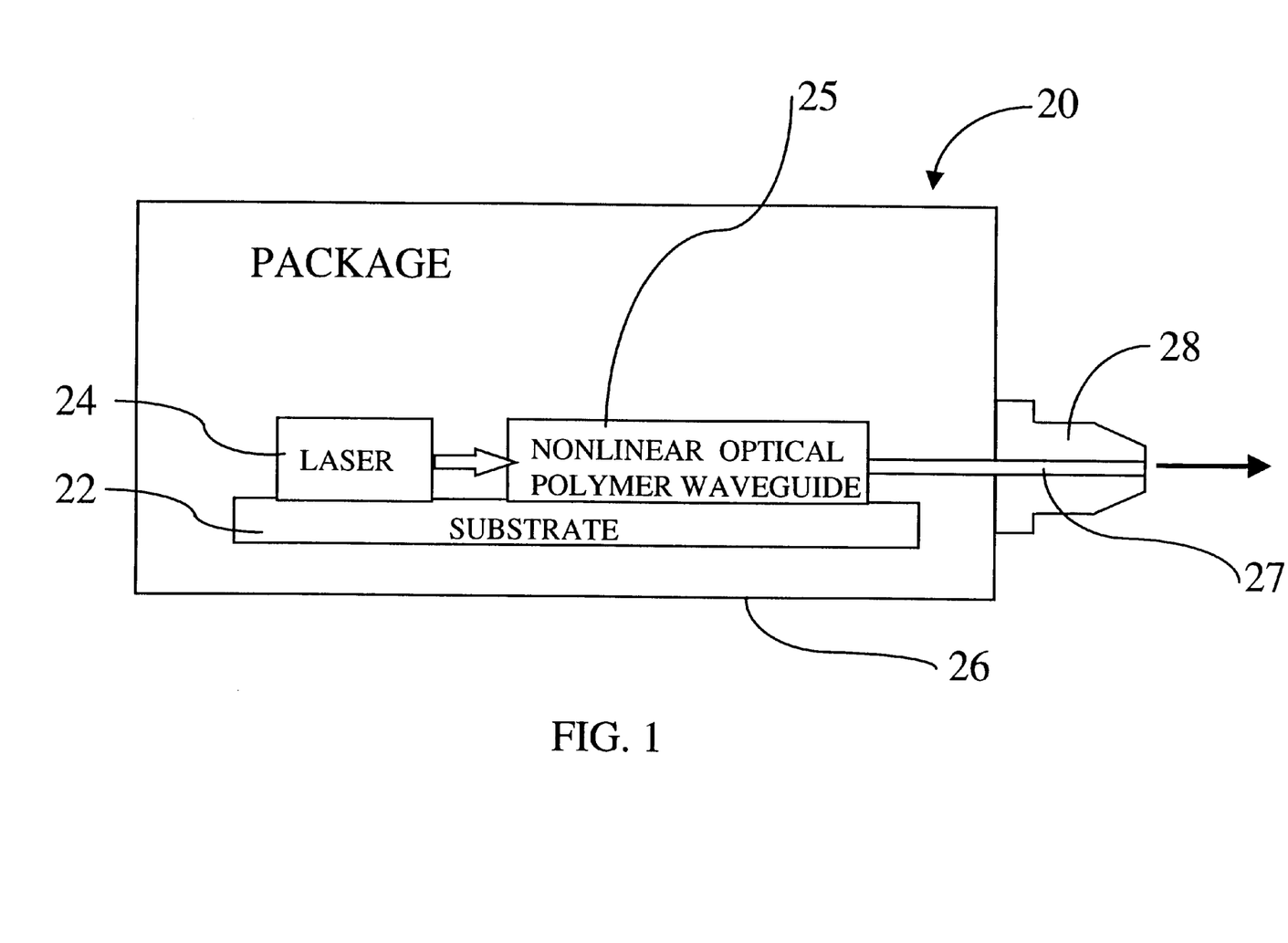
FIG. 1 is a schematic block diagram of a frequency converter in accordance with the invention.
Figure 2:
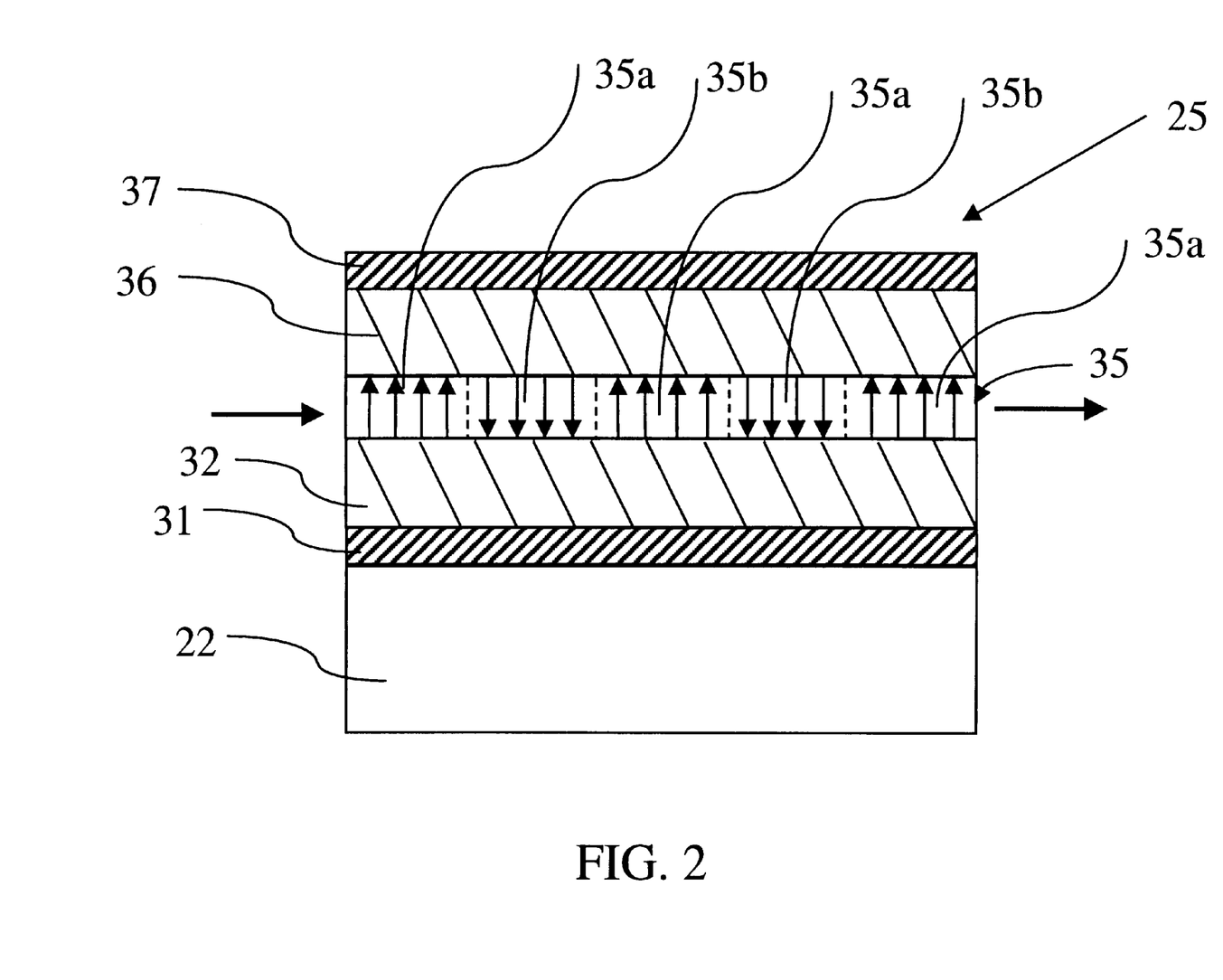
FIG. 2 a greatly enlarged longitudinal cross-sectional view of the nonlinear optical waveguide as shown in FIG. 1.

Referring first to FIGS. 1 and 2, a first embodiment of a nonlinear optical device in the form of an optical frequency converter 20 is described. The frequency converter 20 is based on the principle of second-harmonic generation (SHG) as would be readily understood by those of skill in the art. In particular, the illustrated device includes a substrate 22. A semiconductor laser 24 is formed on the substrate 22 by conventional techniques as will also be readily appreciated by those skilled in the art. The laser 24 is coupled to the nonlinear optical waveguide 25 as will be described in greater detail below. In addition, the illustrated device 20 includes a surrounding package 25, an optical fiber output 27 and an illustrated connector 28 as will also be appreciated by those skilled in the art.

The nonlinear waveguide 25 includes a first electrode layer 31 formed on the substrate 22. A first cladding layer 32 is formed on the first electrode layer 31. The waveguide layer 35 is formed on the first cladding layer 32. In addition, a second cladding layer 36 and second electrode layer 37 are formed on the polymer waveguide layer 35 in the illustrated embodiment.

The waveguide layer 35 preferably comprises a polymer or other matrix material containing chromophores (schematically illustrated by arrows). The chromophores have different dipole moment directions when in a first energy state, such as a ground state, as compared to the dipole moment directions when in a second energy state, such as a first excited energy state. In addition, the chromophores are poled to have alternating first and second dipole moment directions thereby defining corresponding alternately poled waveguide portions 35a, 35b, respectively, as schematically illustrated in FIG. 2. Accordingly, while the previous approaches to forming nonlinear waveguides were limited to poling only in the ground state, the present invention takes advantage of the dipole moments of an excited state to greatly simplify manufacturing of the waveguide. In other words, the present invention simplifies poling and results in optimized quasi-phase matching.

Phase matching in the waveguide layer 35 may be readily achieved for application in optical frequency conversion as illustrated. The periodic modulation provides phase matching which can be achieved with the lowest-order mode of the waveguide. This phase matching typically leads to the highest overlap integral, and, therefore, very efficient frequency conversion. Accordingly, the illustrated frequency conversion device 20 may be used to provide powerful blue lasers via frequency doubling of near infrared diode lasers, as would be readily understood by those skilled in the art.

The chromophores preferably exhibit relatively high second-order nonlinearity. In one embodiment, the chromophores may be poled to have opposite first and second dipole moment directions by making use of different energy states. Other angular orientations are also possible as will be readily appreciated by those skilled in the art. Of course, other energy states may also be used; however, the ground and first level state may be particularly easy to implement.

The chromophores may comprise π-conjugated organic molecules and may be pyridinium cyclopentadienylide or 7,7 diamino-8,8-dicyanoquinodimethan, for example. The polymer also preferably includes a cross-linked polymer, and has a glass transition temperature in range of about 40 to 300° C.

In π-conjugated organic molecules used in quadratic nonlinear optics, the second-order nonlinearity β can be either positive or negative. In the first case (β positive), intramolecular charge transfer occurs from the donor to the acceptor group. However, in the second case (β negative), the charge transfer occurs exceptionally from the acceptor to the donor group. So, upon excitation of molecules with negative second-order nonlinearity, electron density in the vicinity of the electron-acceptor group is transferred to the region of the electron-donor, resulting in charge redistribution in the excited-state opposing the ground-state charge density. This reversal of the charge transfer direction between the ground and the excited-state is associated with an inversion of the dipole moment direction between these two states. Typical examples of molecules with this behavior are, pyridinium cyclopentadienylide as studied by J. O. Morley in Journal of Chemical Society Faraday Transaction, 1994, volume 90 No 13, page 1853, and 7,7-diamino-8,8-dicyanoquinodimethan studied by S. J. Lalama in Applied Physics Letters, 1981, volume 39, No 12, page 940.

Multipolar chromophores may also be used with may produce angle differences of other than 180° in alternating portions. Further, chromophores which are not strictly organic molecules may also be used. For example, certain organo-metallic complexes, such as bis(salicylaldiminato) nickel(II) schiff base complexes may be used. See, for example, "Sizable Second-Order Nonlinear Optical Response of Donor-Acceptor Bis(salicylaldiminato)nickel (II) Schiff Base Complexes", Di Bella et al., Chem. Mater. 1994, 6, pages 881–883.

In addition, materials other than those strictly considered polymers may be used as the matrix material to contain the chromophores. For example, glass monomers and sol-gel may be used as the matrix material as will be readily appreciated by those skilled in the art.

Considering these original properties, introduction of this type of molecule in waveguide structures leads to the development of various novel optical devices, in which phase matching can be achieved in accordance with one aspect of the present invention.

Figure 3:
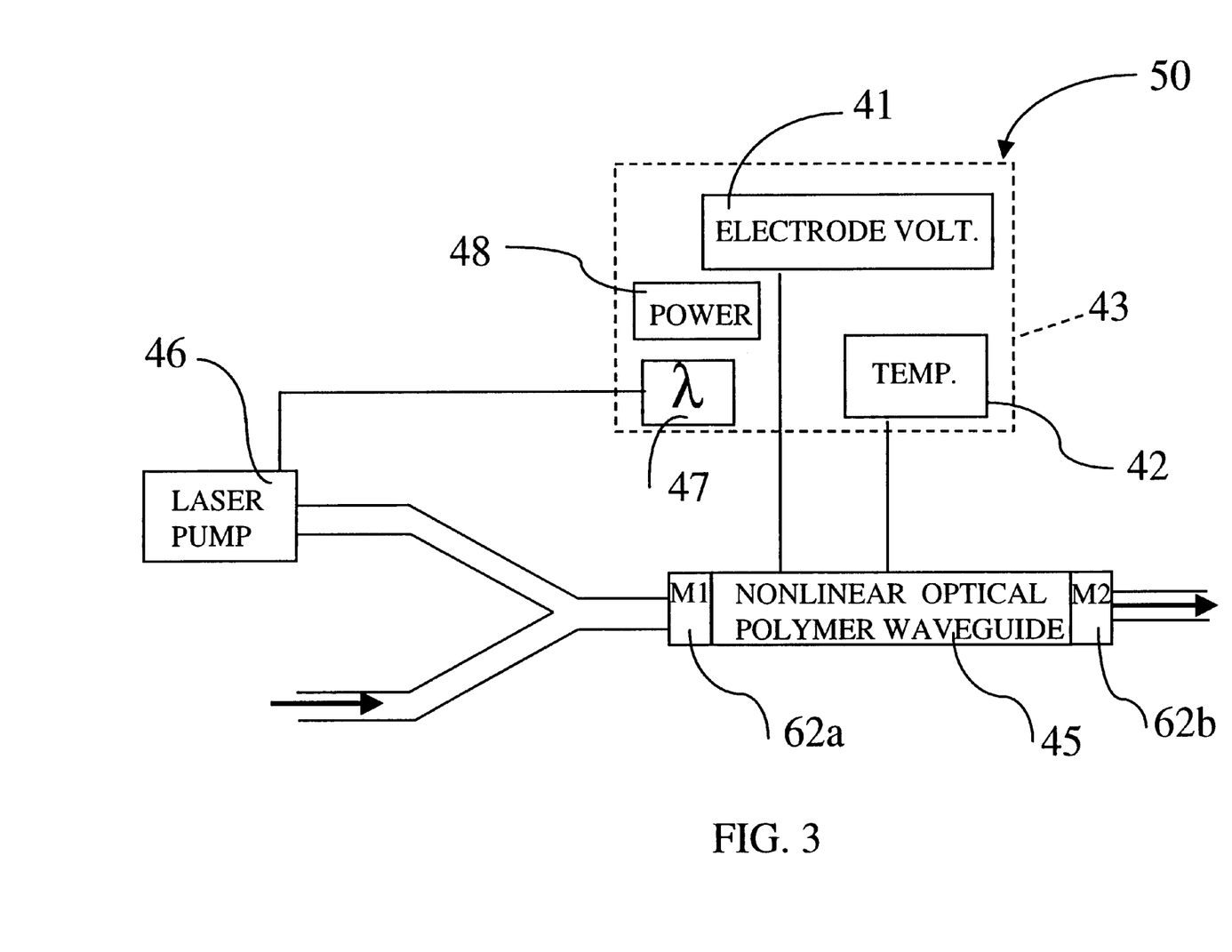
FIG. 3 is a schematic block diagram of an optical parametric amplifier or oscillator in accordance with the present invention.

For example, turning now to the schematic diagram of FIG. 3, a parametric optical amplifier 40 is shown. The parametric amplifier 40 includes a nonlinear optical polymer waveguide 45, and a laser pump 46 coupled to the input to the waveguide along with the signal to be amplified. The laser pump 46 and nonlinear polymer waveguide 45 may be constructed on a substrate as would be readily understood by those skilled in the art. The device 40 may be used for optical parametric amplification especially at telecommunication wavelengths 1300 and 1550 nm, for example. Other frequencies may also be accommodated as would be appreciated by those skilled in the art.

The embodiment of the device 40 described with reference to FIG. 3 illustrates additional features of the invention wherein the periodicity of poled waveguide portions may be controlled while the device 40 is operating. The poled waveguide portions 35a, 35b may be equally spaced thereby defining a periodicity. Accordingly, periodicity control means 43 may be provided for controlling the periodicity relative to the laser pump 46. For example, the periodicity control means 43 may be provided by temperature control means 42 for controlling a temperature of the polymer waveguide 45. The periodicity control means 43 may also include a wavelength controller 47 for the laser pump 46 or a power controller 48 for the laser pump. In addition, the periodicity control means may comprise electric field generating means, such as the illustrated electrode voltage supply 41 and the two electrode layers 31, 37 (FIG. 2), for generating a controllable electric field in the waveguide layer 35 (FIG. 2). Alternately, the electric field may be controllably generated by a corona discharge as will be readily understood by those skilled in the art.

As will be readily understood by those skilled in the art, the structure for parametric amplifier 40 may be readily converted into a parametric oscillator by the addition of the illustrated first mirror M1 62a positioned adjacent a first end of the waveguide, and a second mirror M2 62b positioned adjacent a second end of the waveguide. Light will be reflected back and forth between opposing mirrors 62a, 62b before exiting from the second mirror as would be readily appreciated by those skilled in the art. The mirrors 62a, 62b could be formed by coating the ends of the waveguide as would also be readily understood by those skilled in the art. In addition, more mirrors may be used in embodiments with an external cavity as would also be appreciated by those skilled in the art.

In addition, the device of FIG. 3 may also be used as a duplexer wherein the input, for example, is 1300 nm and the output is at 1550 nm, or vice versa. Such a duplexer may have many applications, particularly in telecommunications as would be readily understood by those skilled in the art.

As would also be appreciated by those skilled in the art, the basic structure of FIG. 3 may also be used for wavelength division multiplexing. Changing the periodicity as described above can control which of two or more input wavelengths are amplified and delivered as an output signal. In slightly different terms, the structure may provide a wavelength selective amplifier.

Figure 4:
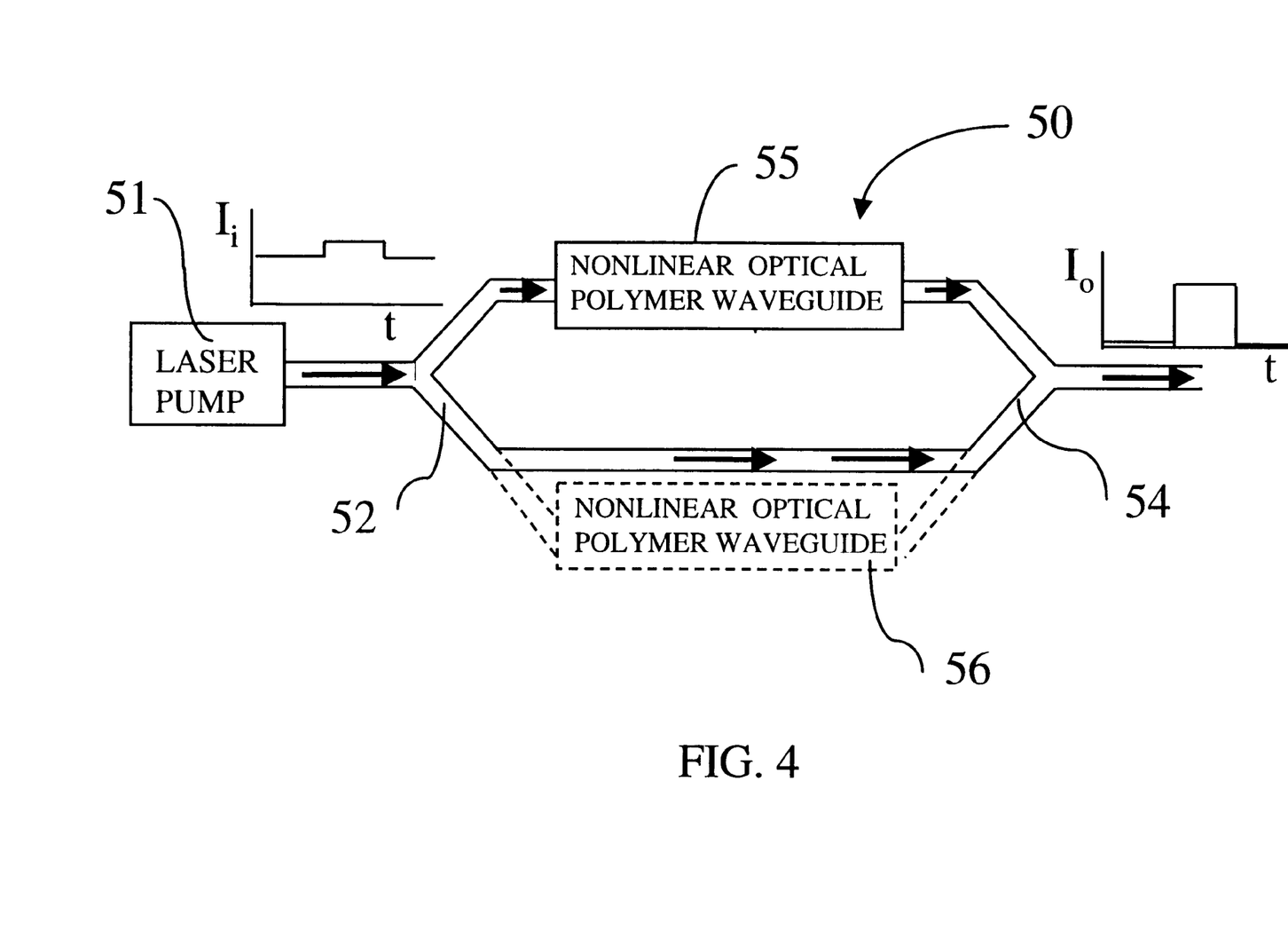
FIG. 4 is a schematic block diagram of an intensity modulated laser source in accordance with the present invention.

Referring now additionally to FIG. 4, an all optical intensity modulated laser device 50 is described. The device includes a laser 51 whose intensity may be modulated between first and second levels as shown in the adjacent graph and as will be readily appreciated by those skilled in the art. The output of the laser 51 passes through a conventional beam splitter 52 provided by the illustrated Y-junction as would be readily understood by those skilled in the art. A first beam portion passes through the nonlinear polymer waveguide 55, and a second beam portion passes along a parallel optical path. The output beam from the nonlinear polymer waveguide 55 is combined with the parallel beam at the optical combiner 54. The resulting output beam from the optical combiner 54 advantageously is made to vary between light and dark intensities considerably larger than at the output of the laser 51.

The intensity modulated device 50 may have a nonlinear waveguide 56 in a second arm so that one has a positive phase shift of ($\pi/2$) and the other has a negative phase shift ($-\pi/2$) as would be readily understood by those skilled in the art. This embodiment may reduce the needed switching intensity for the device.

Figure 5:
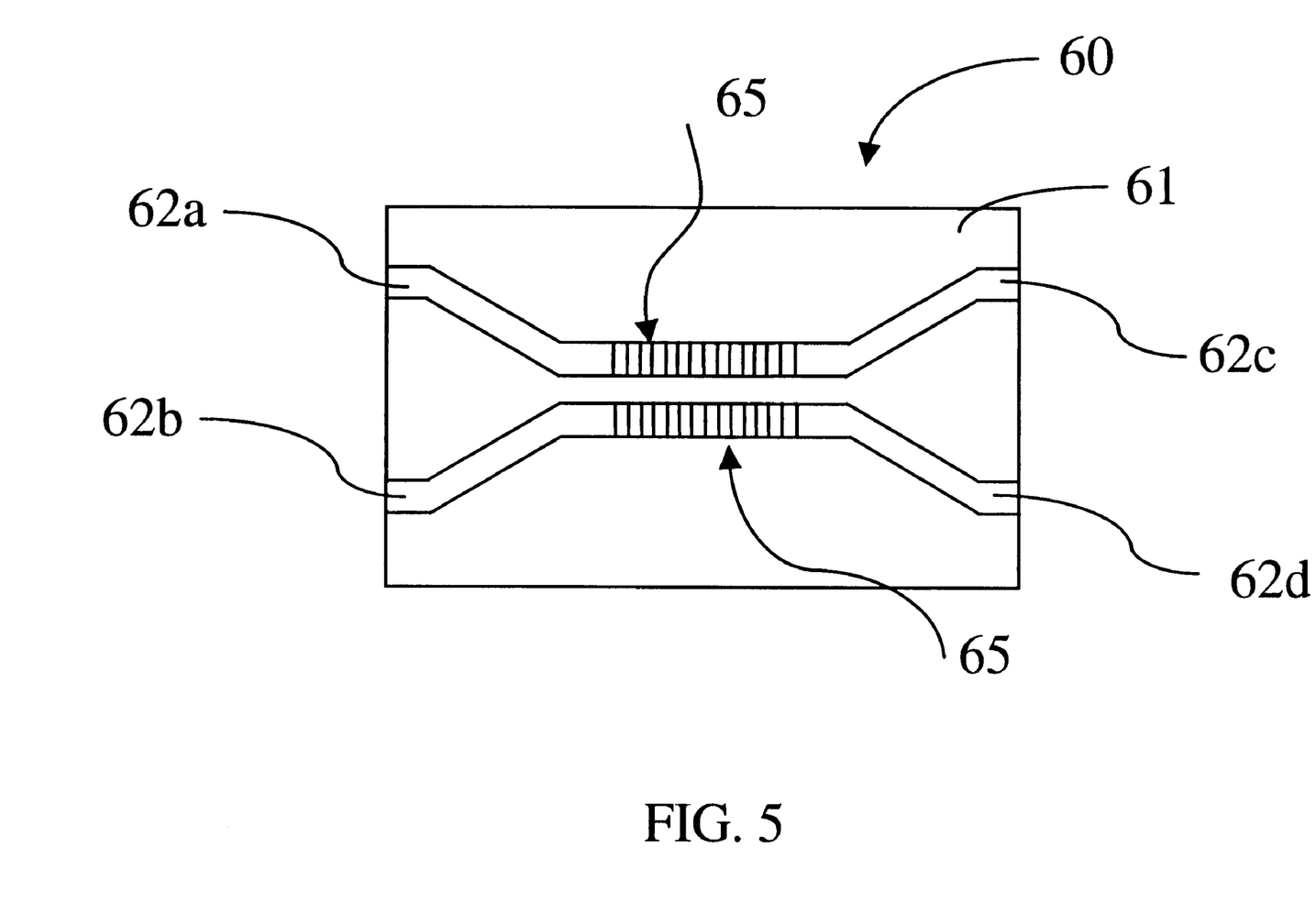
FIG. 5 is a schematic block diagram of a directional coupler in accordance with the present invention.

Turning now to FIG. 5, yet another device—a directional coupler 60—is described as is advantageously based upon the nonlinear waveguide of the present invention. In particular, a pair of nonlinear waveguides 65 are positioned in side-by-side relation on a substrate 61. Light is coupled from one nonlinear waveguide to the other. Various inputs and outputs can be coupled to the waveguide portions 62a–62d as would be readily understood by those skilled in the art to perform a variety of optical functions.

Figure 6:
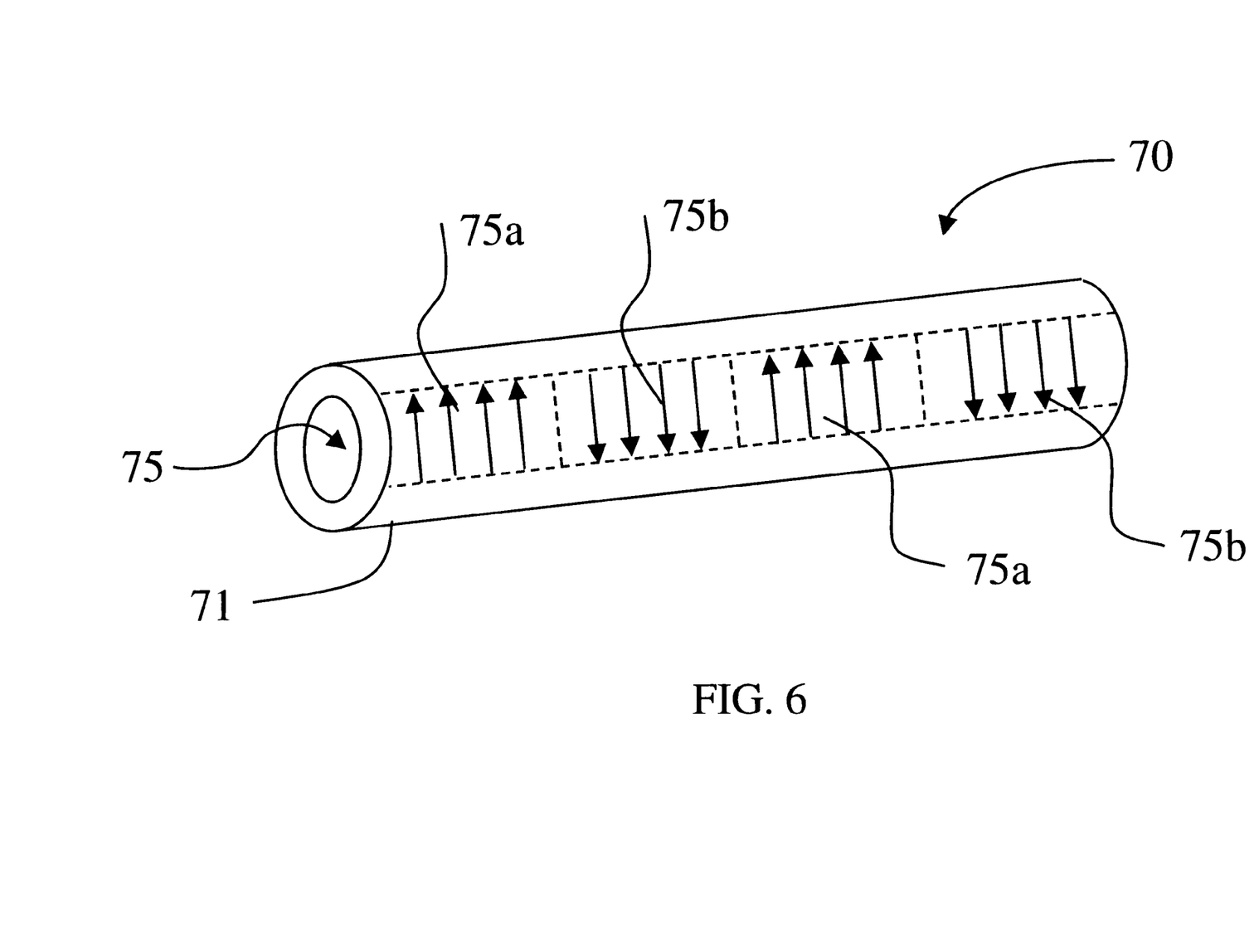
FIG. 6 is a side perspective view of a tubular embodiment of a nonlinear optical waveguide in accordance with the present invention.

Turning now additionally to FIG. 6, another embodiment of a nonlinear device 70 is explained. In this illustrated embodiment, the nonlinear waveguide 75 with alternating poled portions 75a, 75b is formed within a tubular substrate 72. The substrate may also serve as a cladding layer as would be readily understood by those skilled in the art. The illustrated embodiment of the device 70 also shows that the electrode layers have been removed for the finished device. Those of skill in the art will readily appreciate that this embodiment may be formed by the techniques described herein based upon the selection and poling of the chromophores which exhibit different dipole moment directions when in different energy states.

Figure 7:
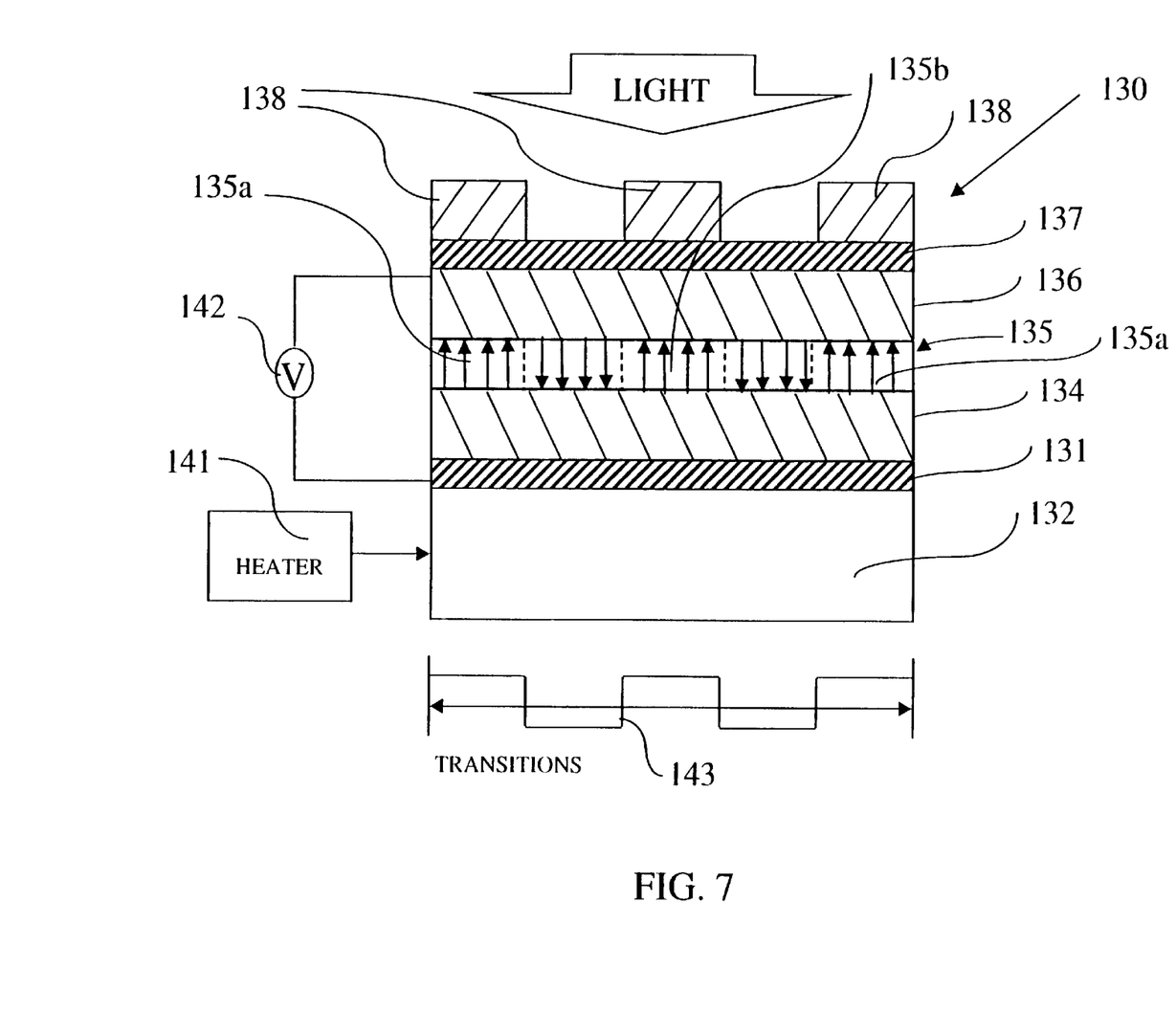
FIG. 7 is a schematic cross-sectional view illustrating a method for making the nonlinear optical waveguide in accordance with the present invention.

In accordance with yet other aspects of the present invention, the periodic poling of the waveguide layer can be achieved by at least two relatively straightforward and inexpensive techniques. Referring now to FIG. 7 a first method for making the waveguide 130 in accordance with the present invention is disclosed. The nonlinear waveguide 130 is fabricated by using a conventional multilayer spin coating on a silicon or fused silica substrate. First a planar electrode 131 is deposited on the substrate 132, then the waveguide layer 135 is sandwiched between two buffer or cladding layers 134, 136. A top electrode 137 is formed from a transparent conductive material, such as indium tin oxide (ITO), as would be readily understood by those skilled in the art.

The first described method uses a periodic mask layer 138 as illustrated. First, the polymer waveguide layer 135 is heated by heater 141 to near its glass transition temperature Tg, thereby enhancing the orientational mobility of the chromophores. In a second step, the polymer waveguide layer 135 is selectively illuminated from the top through the mask layer 138 with either a coherent or incoherent radiation, and an external electric field is applied via the illustrated voltage source 142. The molecules are oriented through electrostatic interaction of the dipole moment with the electric field induced by planar electrodes 131, 137 and the voltage source 142. The chromophores in the masked regions are still in the ground-state, while the molecules of the nonmasked regions are excited to the first molecular excited-state.

Indeed, since the dipole moments of the ground and excited states of these kind of molecules are in opposite directions, the molecules in the masked and nonmasked regions are aligned in opposite directions, as shown in FIG. 7 thereby creating periodic poling of the molecules in alternating polymer portions 135a, 135b. In a next step, the waveguide layer 135 is cooled down to room temperature thus freezing the chromophores orientation before the irradiation and the electric field are turned-off. Alternately, the molecular orientation may be locked by thermal or photocrosslinking as would be readily understood by those skilled in the art. As a consequence, a periodic modulation of the poling is obtained along the waveguide layer 135.

As illustrated in the bottom portion of FIG. 7, the transitions between adjacent regions in the waveguide layer 135 may be relatively sharp, that is, step-like as in the illustrated waveform 143. These relatively sharp transitions may be desirable in certain applications as would be readily appreciated by those skilled in the art. Thereby, the waveguide 135 may exhibit a fully optimized macroscopic nonlinearity and a uniform refractive index thereby leading to a lossless optical waveguide.

What is important to quasi-phase matching is that the optical length in the alternately poled portions 135a, 135b be equal. This is so because the molecular orientation is proportional to the dipole moment of the ground state in portion 135a and to the dipole moment of the excited energy state in portion 135b. In the portions 135b, the molecular orientation also depends on the number of chromophores excited to the first excited energy state as would be readily understood by those skilled in the art. In some cases, an equal optical length of the alternating portions 135a, 135b may not correspond exactly to an equal physical length due to the difference in the index of refraction of the alternating portions 135a, 135b. In other words, a slight increase of the physical length of the portion with the lower index may be preferred as would also be readily appreciated by those skilled in the art.

The grating periodicity is equal to the coherent length of the interacting fundamental and second-harmonic waves. The waveguide may be a slab waveguide or a channel waveguide as would be readily understood by those skilled in the art. For example, for a channel waveguide, the transverse dimension may typically be about 5×20 $\mu$m, or 1×3 $\mu$m and the total length around 1 to 3 cm. Therefore the number of periods for a typical device may be several hundreds.

Figure 8:
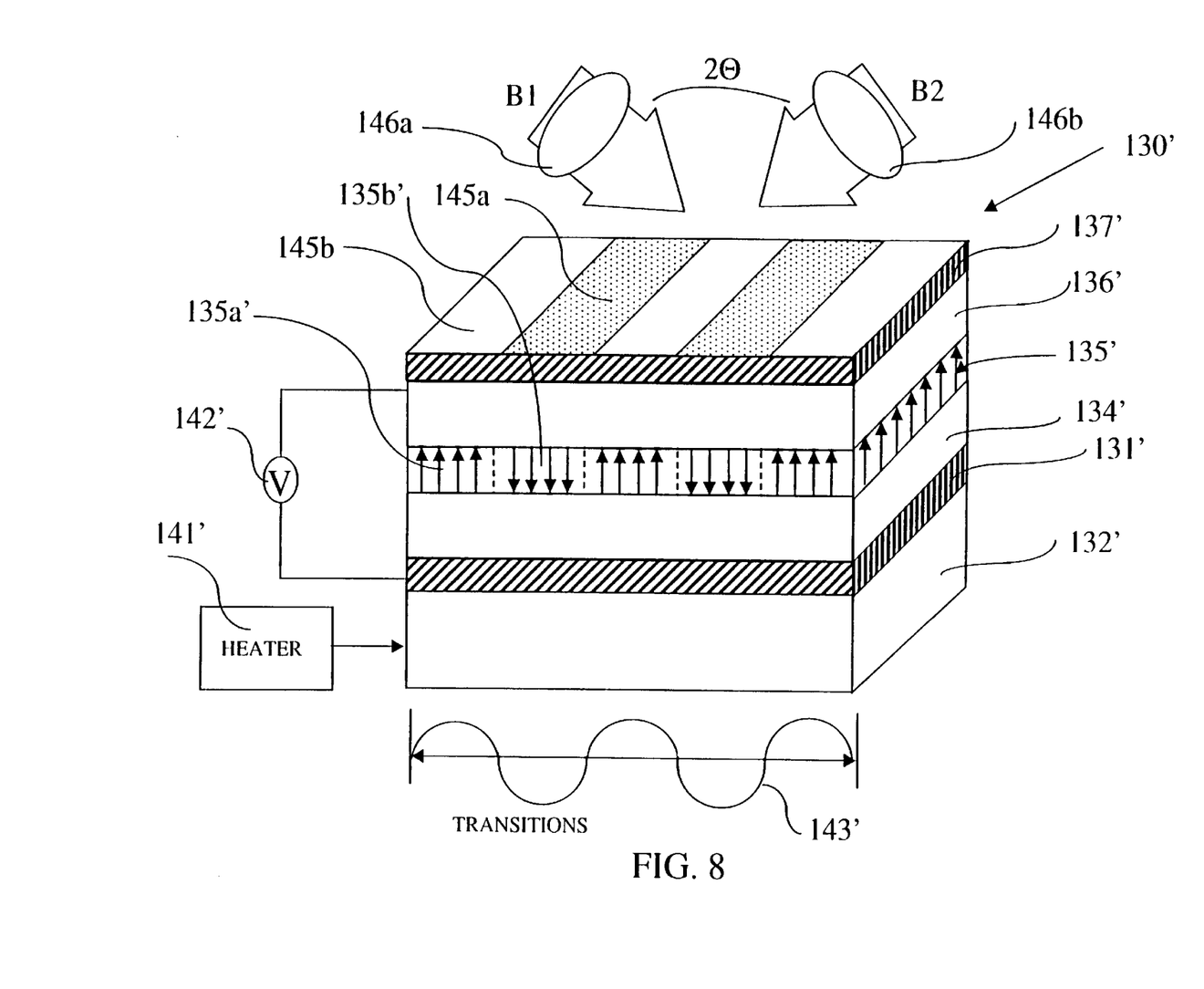
FIG. 8 is a schematic perspective view, partially in section, illustrating another method for making the nonlinear optical waveguide in accordance with the present invention.

Another interesting and readily applied technique to obtain periodical poling of the polymer waveguide based on the molecules described above, is the use of the interference properties of coherent light as understood with reference to FIG. 8. In this illustrated embodiment, prime notation is used to indicate similar elements from the above description of FIG. 7.

The interaction of the two schematically illustrated coherent light beams $B_1$, $B_2$ at a relative angle, induce fringes, which leads to a periodic sequence of bright regions 145a and dark regions 145b in the overlapping area of the device 135'. First, the two laser beams $B_1$, $B_2$, preferably of uniform transverse distribution, are focused by respective schematically illustrated cylindrical lenses 146a, 146b onto the active area of the waveguide, resulting in a periodical modulation of the excitation of the molecules in the waveguide. In the second step, an external electric field is applied by a voltage source 142' at a temperature near the polymer glass transition temperature Tg provided by the heater 141'. This leads to a periodical orientation of the molecules, as explained above. In this embodiment, the transitions 147 are smoother than as described for the preceding method.

After poling, the polymer waveguide 135 is cooled down to room temperature to lock the orientation of the molecules. The induced periodic poling in certain embodiments satisfies the phase matching condition to thereby provide high efficient frequency conversion. The grating period (corresponding to the fringe spacing) can be readily changed simply by varying the angle between the two exciting beams as given by the Bragg condition $\Lambda = \frac{1}{2}(\lambda/\sin\theta)$, where $\lambda$ is the wavelength of the exciting laser beam and $2\theta$ is the angle between the two incident beams.

Alternatively, the angle between the applied electric field and the incident plane of the illuminating light may be changed from 0 (illumination from the top) to 90 degrees (illumination from the side), if desired. For an angle different than 0 degrees, the aligned molecules parallel to the electric field can be excited with a polarized light to optimize the saturation of the excitation of these molecules to the first excited state. Moreover, the use of the incident angle other than 0 degrees allows for the reflection of the exciting light to the side away from the dark region. For normal incidence, a transparent cladding layer, electrodes and substrate is preferred to avoid the back reflection of the exciting light to the dark portions.

In some embodiments, the cladding layer may be eliminated to increase the contrast of the bright and dark portions and thereby reduce the necessary potential difference needed to align the chromophores. In addition, exciting light with a linear, circular, or elliptical polarization may be used to optimize the saturation of the excitation of the chromophores in the bright regions.

In both techniques described above, efficient poling can be obtained by matching the wavelength of the exciting light with the maximum peak of absorption of the chromophore dye which leads to easy saturation of the illuminated molecules. Tunable organic dye lasers in the visible region are suitable for chromophore with different colors (absorption bands) as would be readily appreciated by those skilled in the art.

On account of the dynamic of the excited state of the organic molecules in the host polymer, the life time of the exited state of the molecules is around one half nanosecond, so saturation of the excitation can be reached by pumping all the molecules in the illuminated region to the first excited-state. This can be done either in continuous or pulsed regime as described in the following paragraphs.

In the pulsed regime, the irradiance of the laser is very high, leading to a very high saturation of the excitation of the molecules, and therefore more efficient poling. First, the chromophores are excited to the first excited-state by a pulsed laser. When the saturation reaches its upper level, corresponding usually to the peak of the laser pulse, a short pulsed electric field is applied to orient the molecules before they relax to the ground state. This process is repeated at the repetition rate of the pulsed laser in order to build a macroscopic second-order optical nonlinearity $\chi^{(2)}$ and a quasi-phase matching in the waveguide, until the saturation of $\chi^{(2)}$. After poling, the polymer is subsequently cooled down to room temperature to freeze the chromophores orientation in the host polymer. Permanent stability of the orientation can be achieved by using cross linked polymers which are demonstrated to be stable for many years as would be readily appreciated by those skilled in the art.

In the stationary or continuous regime, a continuous laser is used along with a DC electric field to reach a periodic poling and quasi-phase matching throughout the polymer waveguide. First, the polymer is heated near to its glass transition temperature Tg, and a continuous laser is shined to achieve complete saturation of the molecular excited-state in the illuminated regions. In the second step, the DC electric field is applied to the waveguide in order to create a periodic molecular orientation in the polymer. After poling, the polymer is cooled down to lock the molecules orientation, which leads to a large induced $\chi^{(2)}$ in the channel waveguide and an induced quasi-phase matching as well.

Figure 9:
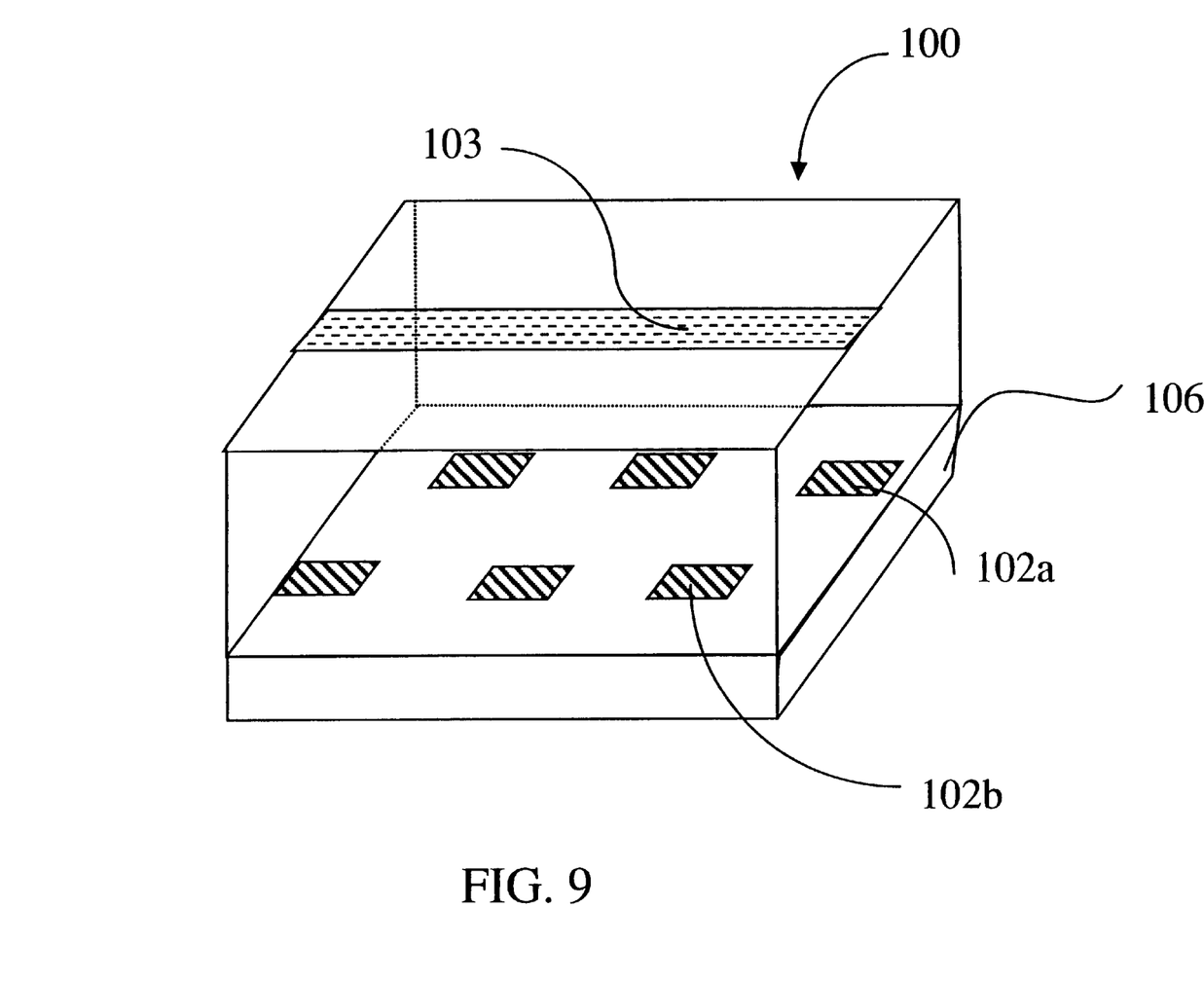
FIG. 9 is a schematic perspective view of another method for making the nonlinear optical waveguide in accordance with the present invention.
Figure 10:
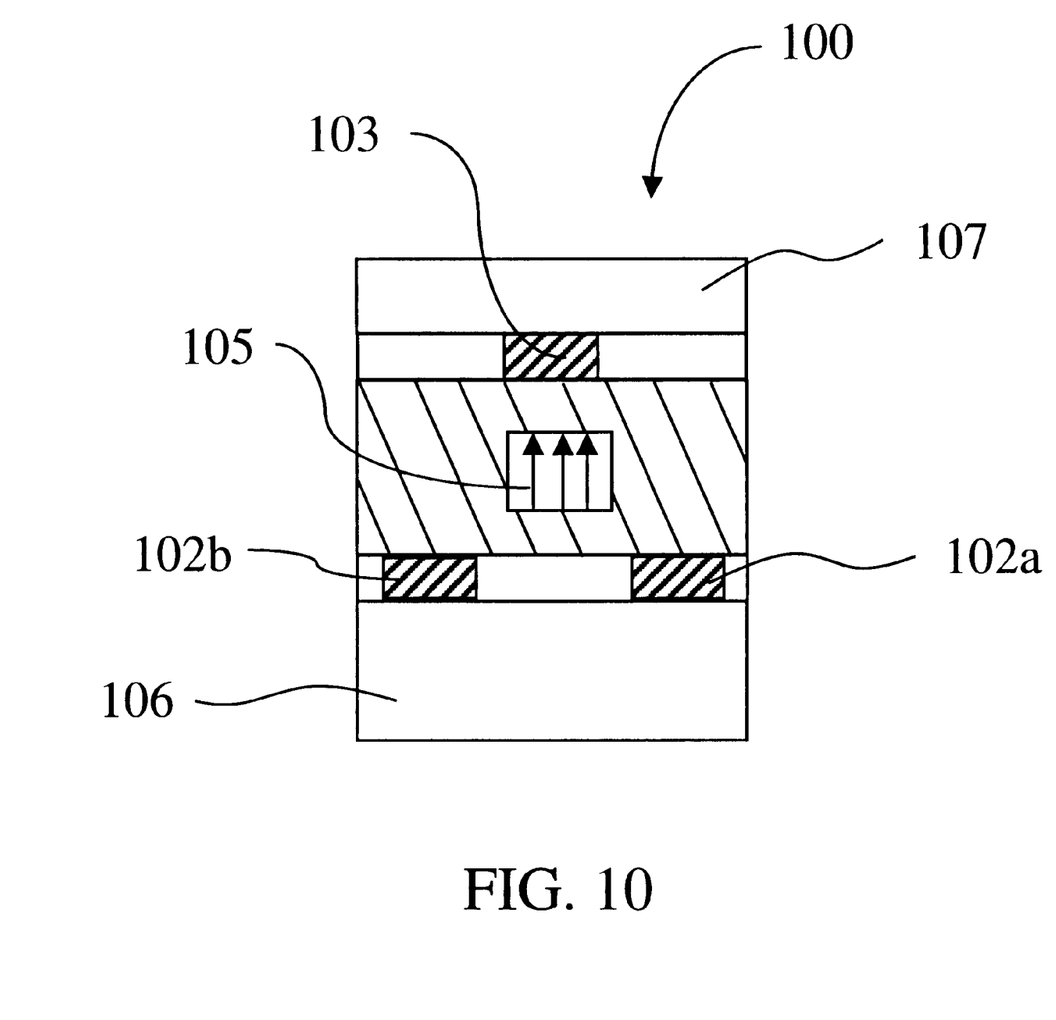
FIG. 10 is a cross-sectional view taken along lines 10—10 in FIG. 9.

In order to enlarge the number of molecules that may be used, an adapted geometry of the electrodes may be used as understood with further reference to FIGS. 9 and 10. In this variation, two rows of spaced bottom electrodes 102a, 102b are provided on the substrate 106. In addition, an upper electrode strip 103 is illustratively provided. According, an electric field of a desired direction could be produced to thereby align the chromophores within the waveguide portion 105 to the desired orientation as would be readily understood by those skilled in the art. In the illustrated embodiment of FIG. 10, the cladding layer 107 is also shown as would also be understood by those skilled in the art.

In other words, the electrode structure shown in FIG. 2, for example, and described above is well suited for chromophores with opposite dipole moment directions when in different energy states. However, for molecules with an angle between the dipole moments ranging from 90 to 180 degrees, an adapted electrode geometry, such as shown in FIGS. 9 and 10 may be provided. It is important for the second order nonlinearity that the nonlinear hyperpolarization vector be parallel to the polarization of the TM or TE modes of the optical waveguide, since the vector of the nonlinear hyperpolarization vector of the chromophores is given by the vector difference between the dipole moment of the two energy states. To account for the angles between the nonlinear hyperpolarization vector and the two dipole moment vectors, respectively of the two energy states, the adapted electrode structure as shown in FIGS. 9 and 10 may be used. Those of skill in the art will recognize other equivalent approached to providing the desired electric fields.

In summary, some examples of applications of the techniques and features of the present invention include:

1. Powerful blue lasers based on second harmonic generation in periodically poled polymeric channel waveguide pumped by powerful laser around 850 nm. Such devices may be very useful for data storage applications for optical discs.
2. High gain optical parametric amplifier based on frequency difference, especially at telecommunication wavelengths (1300 and 1550 nm).
3. High gain optical parametric oscillator based on frequency difference, especially at telecommunication wavelengths (1300 and 1550 nm).

4. All optical switching devices: the high nonlinearity of organic molecules allows low power all optical switching devices based on large nonlinear phase shifts from the second harmonic generation by cascading.
5. Multiplexer for wavelength division multiplexing (WDM) applications.
6. Demultiplexer for WDM demultiplexing applications.
7. Bistable devices Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A nonlinear optical device comprising:
   a waveguide comprising chromophores and a matrix material containing the chromophores;
   said chromophores having different dipole moment directions when in respective different energy states, said chromophores being poled in said matrix material to have alternating first and second dipole moment directions thereby defining corresponding alternately poled, axially distributed waveguide portions, said chromophores in a first of said waveguide portions being poled with the first dipole moment direction and said chromophores in alternating adjacent waveguide portions being poled with the second dipole moment direction.

2. A nonlinear optical device according to claim 1 wherein said chromophores exhibit relatively high second-order nonlinearity.

3. A nonlinear optical device according to claim 1 wherein said chromophores comprise at least one of π-conjugated organic molecules, and organo-metallic complexes.

4. A nonlinear optical device according to claim 1 wherein said chromophores comprise at least one of pyridinium cyclopentadienylide, and 7,7 diamino-8,-8-dicyanoquinodimethan.

5. A nonlinear optical device according to claim 1 wherein said chromophores comprise at least one of (4-formylpyridine) Chromium penta carbonyl, and bis (salicylaldiminato) nickel (II) schiff base complexes.

6. A nonlinear optical device according to claim 1 wherein said matrix material comprises a polymer.

7. A nonlinear optical device according to claim 5 wherein said polymer has a glass transition temperature in range of about 40 to 300° C.

8. A nonlinear optical device according to claim 1 wherein said chromophores are poled to have opposite first and second dipole moment directions.

9. A nonlinear optical device according to claim 1 wherein said chromophores have opposite dipole moment directions when in a ground energy state and a first excited energy level state.

10. A nonlinear optical device according to claim 1 wherein said chromophores are periodically poled to create a quasi-phase matched waveguide so that harmonics of an input beam propagate through the poled waveguide portions and constructively interfere at an output of the waveguide.

11. A nonlinear optical device according to claim 1 further comprising a laser coupled to said waveguide.

12. A nonlinear optical device according to claim 10 wherein said chromophores are periodically poled; and further comprising periodicity control means for controlling the periodicity of said chromophores relative to said laser.

13. A nonlinear optical device according to claim 12 wherein said periodicity control means comprises temperature control means for controlling a temperature of said waveguide.

14. A nonlinear optical device according to claim 12 wherein said periodicity control means comprises wavelength control means for controlling a wavelength of said laser.

15. A nonlinear optical device according to claim 13 wherein said periodicity control means comprises wavelength control means for controlling a power of said laser.

16. A nonlinear optical device according to claim 12 wherein said periodicity control means comprises electric field generating means for generating a controllable electric field in said waveguide.

17. A nonlinear optical device according to claim 1 further comprising an optical pump cooperating with said waveguide so that the device is one of a parametric amplifier and a duplexer.

18. A nonlinear optical device according to claim 1 further comprising a beam splitter, a parallel optical path, and a beam combiner cooperatively arranged with said waveguide so that the device is an optical modulator.

19. A nonlinear optical device according to claim 1 further comprising an optical pump and an optical cavity cooperatively arranged with said waveguide so that the device is a parametric oscillator.

20. A nonlinear optical device according to claim 1 further comprising a second waveguide adjacent the first waveguide and optically coupled thereto so that the device is an optical directional coupler.

21. A nonlinear optical device according to claim 1 further comprising a substrate adjacent said waveguide.

22. A nonlinear optical device according to claim 21 further comprising a package surrounding said substrate and said waveguide.

23. A nonlinear optical device according to claim 21 wherein said substrate is generally planar.

24. A nonlinear optical device according to claim 21 wherein said substrate is generally tubular.

25. A nonlinear optical device according to claim 1 wherein adjacent poled waveguide portions have relatively sharp susceptibility transitions therebetween.

26. A nonlinear optical device according to claim 1 wherein adjacent poled waveguide portions have relatively smooth susceptibility transitions therebetween.

27. A nonlinear optical device according to claim 1 further comprising at least one cladding layer positioned adjacent said waveguide.

28. A nonlinear optical device according to claim 1 further comprising at least one electrode layer positioned adjacent said waveguide.

29. A nonlinear optical device according to claim 1 wherein said chromophores have non-opposite different dipole moment directions when in the different energy states; and further comprising adaptive electrode means for facilitating poling of the alternating waveguide portions in first and second directions despite the non-opposite different dipole moment directions of the chromophores.

30. A nonlinear optical device comprising:
   a waveguide comprising chromophores and a matrix material containing the chromophores;
   said chromophores having different and non-opposite different dipole moment directions when in respective different energy states, said chromophores being poled in said matrix material to have alternating first and second dipole moment directions thereby defining corresponding alternately poled, axially distributed waveguide portions, said chromophores in a first of said waveguide portions being poled with the first dipole moment direction and said chromophores in alternating adjacent waveguide portions being poled with the second dipole moment direction.

31. A nonlinear optical device according to claim 30 further comprising adaptive electrode means for facilitating poling of the alternating waveguide portions in first and second directions despite the non-opposite different dipole moment directions of the chromophores.

32. A nonlinear optical device according to claim 30 wherein said chromophores exhibit relatively high second-order nonlinearity.

33. A nonlinear optical device according to claim 30 wherein said chromophores comprise at least one of π-conjugated organic molecules, and organometallic complexes.

34. A nonlinear optical device according to claim 30 wherein said chromophores comprise pyridinium cyclopentadienylide.

35. A nonlinear optical device according to claim 30 wherein said chromophores comprise 7,7 diamino-8,8-dicyanoquinodimethan.

36. A nonlinear optical device according to claim 30 wherein said chromophores comprise bis(salicylaldiminato) nickel(II) schiff base complexes.

37. A nonlinear optical device according to claim 30 wherein said matrix material comprises a polymer.

38. A nonlinear optical device according to claim 30 further comprising a substrate adjacent said waveguide.

39. A nonlinear optical device according to claim 38 further comprising a package surrounding said substrate and said waveguide.

40. A nonlinear optical device according to claim 38 wherein said substrate is generally planar.

41. A nonlinear optical device according to claim 38 wherein said substrate is generally tubular.

42. A nonlinear optical device according to claim 30 further comprising at least one cladding layer positioned adjacent said waveguide.

43. A nonlinear optical device according to claim 30 further comprising at least one electrode layer positioned adjacent said waveguide.

44. A method for making a nonlinear optical device comprising the steps of:
forming a waveguide comprising chromophores and a matrix material containing the chromophores, the chromophores having different dipole moment directions when in respective different energy states; and
poling the chromophores to have first and second dipole moment directions in respective poled, axially distributed waveguide portions, said chromophores in a first of said waveguide portions being poled with the first dipole moment direction and said chromophores in alternating adjacent waveguide portions being poled with the second dipole moment direction.

45. A method according to claim 44 wherein the step of poling comprises poling the chromophores to have alternating first and second dipole moment directions.

46. A method according to claim 44 wherein said chromophores exhibit relatively high second-order nonlinearity.

47. A method according to claim 44 wherein said chromophores comprise at least one of π-conjugated organic molecules, and organo-metallic complexes.

48. A method according to claim 44 wherein said chromophores comprise pyridinium cyclopentadienylide.

49. A method according to claim 44 wherein said chromophores comprise at least one of 7,7 diamino-8,8-dicyanoquinodimethan and bis(salicylaldiminato) nickel (II) schiff base complexes.

50. A method according to claim 44 wherein said chromophores comprise bis(salicylaldiminato)nickel(II) schiff base complexes.

51. A method according to claim 44 wherein said polymer comprises a crosslinkable polymer; and further comprising the step of crosslinking the crosslinkable polymer.

52. A method according to claim 44 wherein the step of poling comprises poling said chromophores to have opposite first and second dipole moment directions in alternating waveguide portions.

53. A method according to claim 44 wherein said chromophores have different dipole moment directions when in a ground energy state and when in an excited energy state; and wherein the step of poling comprises the steps of:
selectively exciting alternating portions of the waveguide to change the excited chromophores to the different dipole moment direction; and
applying an electric field to pole the chromophores to the first and second dipole moment directions.

54. A method according to claim 53 further comprising the step of heating the waveguide to near a glass transition temperature during the step of applying the electric field and the step of cooling the heated waveguide after poling.

55. A method according to claim 53 wherein the step of selectively exciting comprises the steps of:
masking surface portions of the waveguide in a periodic pattern; and
illuminating the masked surface of the waveguide to excite the chromophores of exposed portions of the waveguide.

56. A method according to claim 53 wherein the step of selectively exciting comprises the steps of:
generating a plurality of laser beams; and
directing the laser beams to a surface of the waveguide to generate a pattern of alternating illuminated and dark bands via constructive and destructive interference of the laser beams.

57. A method according to claim 56 wherein the step of directing the laser beams comprises directing same at a predetermined angle to control a periodicity of the alternating illuminated and dark bands.

58. A method according to claim 44 further comprising the step of controlling a periodicity of the alternately poled waveguide portions by controlling an operating wavelength.

59. A method according to claim 44 further comprising the step of controlling a periodicity of the alternately poled waveguide portions by controlling an operating power.

60. A method according to claim 44 further comprising the step of controlling a periodicity of the alternately poled waveguide portions by controlling a temperature of said waveguide.

61. A method according to claim 44 further comprising the step of controlling a periodicity of the alternately poled waveguide portions by controlling an electric field applied to said waveguide.

62. A method according to claim 44 further comprising the step of forming at least one cladding layer adjacent said waveguide.

63. A method according to claim 44 further comprising the step of forming at least one electrode layer adjacent said waveguide.

64. A method according to claim 44 wherein the forming step comprises forming the waveguide on one of a planar or tubular substrate.

65. A method according to claim 64 further comprising the step of enclosing said substrate and the waveguide in a package.

66. A method according to claim 44 wherein said chromophores have non-opposite different dipole moment directions when in the different energy states; and wherein the step of poling further comprises using electrodes in predetermined positions to pole the alternating waveguide portions in opposite first and second directions despite the non-opposite different dipole moment directions of the chromophores.

67. A method according to claim 44 wherein said chromophores comprise (4-formylpyridine) Chromium penta carbonyl.

68. A method according to claim 53 wherein the step of selectively exciting comprises the step of:

using a phase mask to illuminate the waveguide in a periodic pattern.

69. A method according to claim 53 wherein the step of selectively exciting includes the step of exposing the waveguide to a continuous optical energy source.

70. A method according to claim 53 wherein the step of selectively exciting includes the step of pulse synchronizing an optical energy pulse source with a pulsed electric field.

71. A method according to claim 53 wherein the step of selectively exciting includes the step of exposing portions of the waveguide to optical energy of at least one of the polarization states of linear, circular and elliptical.

* * * * *